(12) United States Patent  (10) Patent No.: US 9,144,227 B2
Stein  (45) Date of Patent: Sep. 29, 2015

(54) CONTROL LEASH

(71) Applicant: Howard Stein, White Plains, NY (US)

(72) Inventor: Howard Stein, White Plains, NY (US)

( * ) Notice: Subject to any disclaimer, the term of this patent is extended or adjusted under 35 U.S.C. 154(b) by 0 days.

(21) Appl. No.: 13/769,168

(22) Filed: Feb. 15, 2013

(65) Prior Publication Data

US 2013/0228140 A1  Sep. 5, 2013

Related U.S. Application Data

(60) Provisional application No. 61/606,143, filed on Mar. 2, 2012.

(51) Int. Cl.
*A62B 35/00* (2006.01)
*A01K 27/00* (2006.01)

(52) U.S. Cl.
CPC ................................... *A01K 27/003* (2013.01)

(58) Field of Classification Search
CPC .............................. A01K 27/00; A01K 27/003
USPC ......... 119/769, 770, 772, 778, 779, 780, 781, 119/791, 792, 793, 795, 796, 797, 798, 801, 119/802, 804, 863, 864, 865
See application file for complete search history.

(56) References Cited

U.S. PATENT DOCUMENTS

| 564,295 | A | | 7/1896 | Steinmetz |
| 1,734,195 | A | | 11/1929 | Blecha |
| 2,275,983 | A | * | 3/1942 | Nadeau .......................... 119/770 |
| 3,441,005 | A | | 4/1969 | Blecha |
| 4,993,366 | A | | 2/1991 | Sager |
| 5,146,876 | A | | 9/1992 | McPhail |
| 5,161,486 | A | * | 11/1992 | Brown .......................... 119/795 |
| 5,724,921 | A | * | 3/1998 | Bell .............................. 119/795 |
| 5,732,662 | A | | 3/1998 | Jacobsen |
| 5,839,394 | A | | 11/1998 | Dickison |
| 5,873,328 | A | | 2/1999 | Campbell |
| 5,915,336 | A | | 6/1999 | Watson |
| 6,053,129 | A | | 4/2000 | Akre |
| 6,085,696 | A | | 7/2000 | Fisher |
| 6,095,093 | A | | 8/2000 | Kisko et al. |
| 6,216,641 | B1 | | 4/2001 | Tracy et al. |
| 6,273,029 | B1 | | 8/2001 | Gish |

(Continued)

FOREIGN PATENT DOCUMENTS

| EP | 1994823 | 11/2008 |
| JP | 2005198629 | 7/2005 |

(Continued)

*Primary Examiner* — Rob Swiatek
*Assistant Examiner* — Ebony Evans
(74) *Attorney, Agent, or Firm* — Ohlandt, Greeley, Ruggiero & Perle, L.L.P.

(57) ABSTRACT

A leash that allows any individual to control a pulling dog without risking injury or walking in an unsafe manner. The disclosed leash maximizes body mechanics and basic pulley/lever principles to achieve more strength. The leash comprises a cuff that preferably wraps around a user's arm above the elbow. Attached to the cuff are a few feet of leash material that freely runs through an O-ring and ends in a handle. Attached to the O-ring are another few feet of leash ending with a clip that can go to a dog collar. When the dog pulls, the user pulls the handle. The resulting force goes through the O-ring, which acts as a pulley and on to the arm cuff and back of the arm, utilizing stronger shoulder and back muscles. Therefore the user is able to pull back with a lot more force than is obtainable with a typical leash.

20 Claims, 7 Drawing Sheets

(56) References Cited

U.S. PATENT DOCUMENTS

| | | | |
|---|---|---|---|
| 6,371,055 B1 | 4/2002 | Lawrence | |
| 6,450,129 B1 | 9/2002 | Flynn | |
| 6,460,488 B1 | 10/2002 | Manzella et al. | |
| 6,467,437 B2 | 10/2002 | Donovan et al. | |
| 6,511,121 B1 * | 1/2003 | Cochran et al. | 297/16.1 |
| 6,626,132 B1 | 9/2003 | Mann | |
| 6,675,742 B1 | 1/2004 | Shiraki | |
| 6,701,873 B2 * | 3/2004 | Fradette, II | 119/784 |
| 6,827,045 B1 | 12/2004 | Willner et al. | |
| 6,971,334 B1 | 12/2005 | Livesay et al. | |
| 6,990,929 B2 | 1/2006 | Young, III | |
| 7,188,585 B1 | 3/2007 | Carter | |
| 7,367,287 B1 | 5/2008 | Jones, Jr. | |
| 7,418,926 B2 | 9/2008 | Kung | |
| 7,490,457 B1 | 2/2009 | Peck | |
| 7,640,895 B2 | 1/2010 | Fountoulakis et al. | |
| 7,685,972 B2 | 3/2010 | Zacho et al. | |
| 7,743,735 B2 | 6/2010 | Weinberg | |
| 7,779,789 B2 | 8/2010 | Tanaya | |
| 8,079,329 B1 * | 12/2011 | Pujol et al. | 119/796 |
| 2005/0217610 A1 | 10/2005 | Thompson et al. | |
| 2005/0241596 A1 | 11/2005 | Deverall | |
| 2006/0272595 A1 | 12/2006 | Edwards | |
| 2009/0044763 A1 | 2/2009 | Russo et al. | |
| 2009/0235873 A1 | 9/2009 | Gould et al. | |
| 2009/0308329 A1 | 12/2009 | Sanchez | |
| 2009/0320769 A1 | 12/2009 | McCay | |
| 2010/0024741 A1 | 2/2010 | Schoppman | |
| 2010/0037833 A1 | 2/2010 | Joung et al. | |
| 2010/0050956 A1 | 3/2010 | Pellei | |
| 2010/0199926 A1 | 8/2010 | McCullough et al. | |
| 2010/0251971 A1 | 10/2010 | Hsieh | |
| 2010/0258061 A1 | 10/2010 | Miron | |
| 2010/0269764 A1 | 10/2010 | Rogers | |
| 2010/0288207 A1 | 11/2010 | Hollenbeck et al. | |
| 2011/0000440 A1 | 1/2011 | Mucerino et al. | |
| 2011/0011352 A1 | 1/2011 | Lee | |
| 2011/0120390 A1 | 5/2011 | Kung | |
| 2012/0260865 A1 * | 10/2012 | Nesper | 119/792 |

FOREIGN PATENT DOCUMENTS

| | | |
|---|---|---|
| JP | 2005278514 | 10/2005 |
| JP | 2005318877 | 11/2005 |
| WO | WO2006039816 | 4/2006 |

* cited by examiner

CONTROL LEASH

CROSS-REFERENCES TO RELATED APPLICATIONS

This application claims the benefit of the filing date of U.S. provisional application Ser. No. 61/606,143, filed on Mar. 2, 2012.

FIELD OF INVENTION

The present invention relates generally to an apparatus for a leash. More specifically, the present invention is an apparatus for a pet leash that attaches to a user's arm for more control over the pet.

BACKGROUND OF THE INVENTION

There are many dogs that pull very strongly for various reasons when walked, and owners that frequently struggle to gain control. At times this results in various injuries or owners giving up their otherwise likable dogs. Even medium sized dogs can produce a strong pulling force that can overwhelm children and adults that are not a matching size, weight, or strength. This is not a new problem and various methods have been used to address the challenge.

To prevent the leash from breaking, leashes have been produced in which the material is stronger, such as doubling the thickness of nylon webbing or using leather instead of nylon. These solutions prevent the strong dog from breaking the material but do not address the issue of easier control.

One method of control includes using a choke collar. As the name implies, when the leash is pulled, the collar chokes the dog and the dog stops pulling in order to reduce the sensation. Choke collars can include chain, leather, and various spiked materials. Many owners feel this is harmful to the dog and do not consider it an option.

Some solutions use a harness instead of a collar on the dog. The leash used is the same but the harness is a series of straps that result in pulling the dog from underneath instead of on top. This does reduce the pulling since dogs respond quicker. The challenge with these harnesses is the difficulty in putting on a complex series of straps and buckles each time the owner wants to use it. They also stretch out with time. Harness type products are where most of the commercial efforts have been made to reduce dogs from excessive pulling.

Retractable leashes designed for larger dogs are another option. These have a heavier duty mechanism for the larger breeds but do not reduce the excessive pulling and will not retract under force. The mechanism will also break since the line or webbing has to be thin enough to retract and can foul the inner workings.

Other solutions include additional hand loops for shorter grabs on the leash, various ways to create a spring type leash where a device can expand and pull back, or leashes that are designed for active children, which may include a harness. There are also leashes with a simple attachment to the waist. None of these solutions are a practical and consistent method to control a dog under a variety of conditions with minimal impact to the dog or human.

Training a dog not to pull at all is one of the best solutions; however, many owners do not spend the time or money necessary to train and see significant results.

The traditional, simple, well-known type of leash is made either of nylon webbing usually one-inch diameter or leather with a loop at one end and a clip on the other. If the user holds the loop like a handle and there is a strong pulling force, much of the force is being held only by the fingers. It is recommended that a user put his/her hand through the loop and grip the leash. That transfers most of the force to the back of the hand and the wrist, followed by a much lesser extent, the arm and shoulder. This method of holding the leash does not give sufficient control over a strong pulling dog. Injuries to the wrist, dislocations of the shoulder and falls resulting in injury have been known to occur.

It is therefore an object of the present invention to use a person's natural body mechanics to maximize the human pulling force on any animal. The present invention accomplishes this by using a different method of design and attachment of the leash to the human body.

SUMMARY OF THE INVENTION

The present invention is a leash that allows any individual to control a pulling dog without risking injury or walking in an unsafe manner. The present invention maximizes body mechanics and basic pulley/lever principles to achieve more strength. The present invention comprises a cuff that wraps around a body appendage, particularly around user's arm above the elbow. Attached to the cuff are a few feet of leash material that freely runs through an O-ring and ends in a handle. Attached to the O-ring are another few feet of leash ending with a clip that can go to a dog collar. When the dog pulls, the user pulls the handle backwards. The resulting force goes through the O-ring, which is acting as a pulley and on to the cuff and body appendage, e.g., the back of the arm and thus utilizing stronger shoulder and back muscles to help distribute the pulling force from the dog. Therefore the user is able to pull back with a lot more force than is obtainable with a typical leash.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF THE PREFERRED EMBODIMENTS

A better understanding of the disclosed embodiments will be obtained from the following detailed descriptions and accompanying drawings. All illustrations of the drawings are for the purpose of describing selected versions of the preferred embodiments and are not intended to limit the scope of the present invention. According to one embodiment described herein, a leash is disclosed for walking and controlling a dog that has excessive pulling force. The dog may be large and strong or a medium size dog that has a lot of strength.

Figure 1:
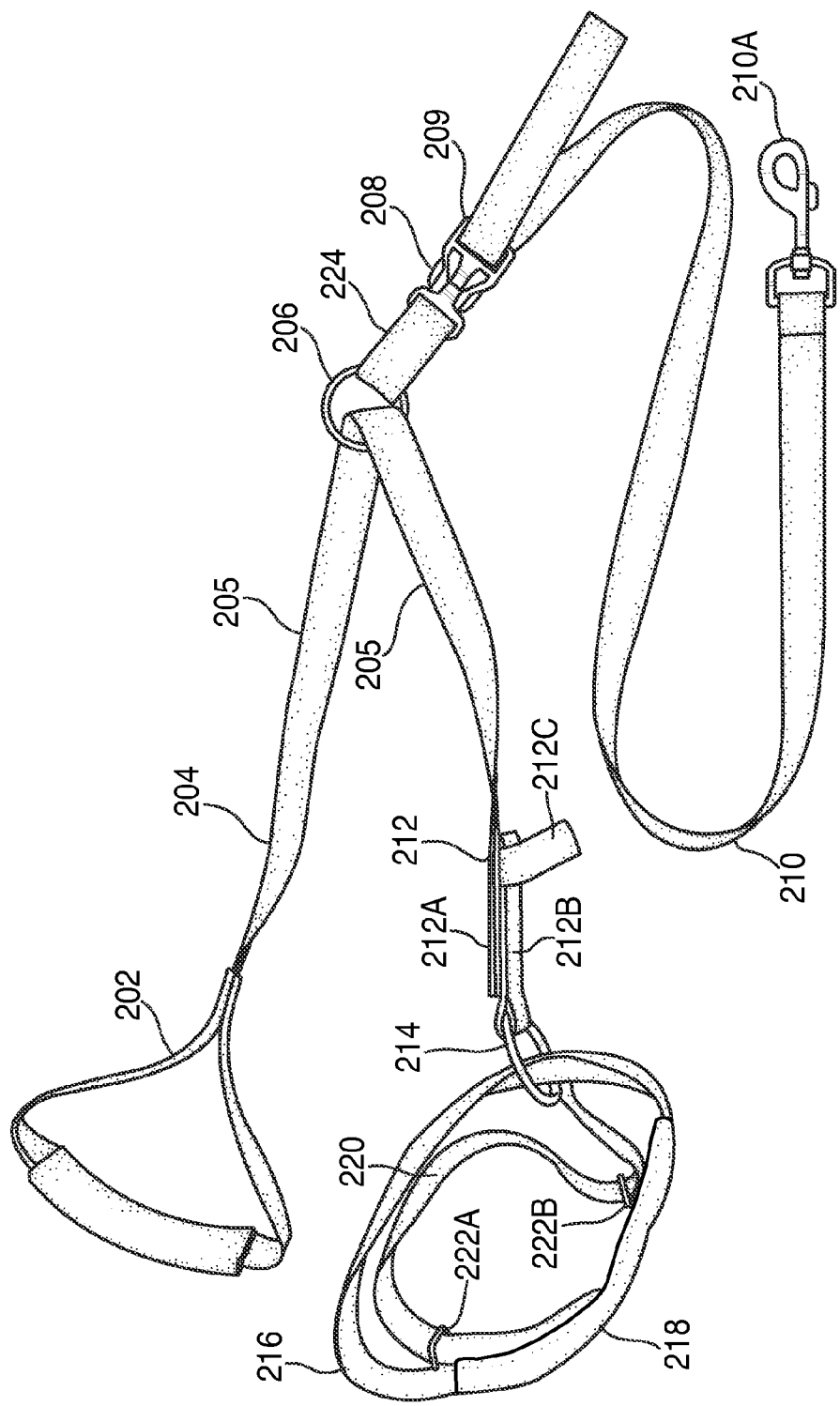
FIG. 1 is a top-side diagram of a first embodiment of the present invention.

The leash may comprise the following components, with all component numbers referring to FIG. 1:
- 202 Handle
- 204 Webbing
- 205 Upper Leash
- 206 O Ring Pulley
- 208 Squeeze Release Buckle
- 209 Adjusting slide bar
- 210 Lower Leash
- 210A Dog Clip
- 212 Quick Release
- 214 Large D Ring
- 216 Arm Cuff
- 218 Arm Cuff—Outer Cuff with Back Padding
- 220 Arm Cuff—Inner Cuff Elastic Velcro on one side
- 222 Loop Locks A & B
- 224 Lower Leash Section The lower leash 210 that runs from the O-ring pulley 206 to the dog collar has a standard clip 210A that attaches to any dog harness or collar. The clip 210A may be sewn to the lower leash 210, which is the preferred method of joining material components or otherwise permanently attached to the preferred material of flat nylon webbing 204. The nylon webbing 204 can be any color with any variety of graphics, lettering or customization. Leather, chain, cable, rope, cloth or any suitable material for the leash may also be used. In this embodiment, the flat nylon webbing 204 is preferably 1 inch wide, but may be any widths ranging from ¼ inch to over 2 inches. The nylon flat webbing then runs several feet to where it is attached to a squeeze release buckle 208. The squeeze release buckle 208 can be multiple colors and sizes depending on the width of the webbing 204; it is also part of an adjustable slide bar 209 on one side that allows the leash to be adjusted to multiple lengths. The part of the leash that is attached to the clip 210A is fed through the adjustable slide bar 209 so the webbing can lock down on itself and stay in the adjusted position. When the sides of the squeeze release buckle 208 are squeezed, the mechanism detaches completely and the clip 210A attached to the dog along with the length of webbing and part of the squeeze release buckle 208 are completely free from the leash and attached only to the dog. This allows easy disentanglement that may occur from playing with other dogs. Note that, as one of ordinary skill in the art will readily recognize, the squeeze release buckle 208 shown in FIG. 1 is the presently preferred quick release, but other types of quick release mechanisms may be used, including, but not limited to, the Velcro-like mating straps discussed below.

On the opposite side of the adjustable slide bar and squeeze release buckle 208 is a small 1 to 4 inch piece of webbing section 224 where one end of the webbing is attached permanently around the small bar of the quick release 208 in such a way to allow it to rotate freely. The other end of section 224 is attached in the same manner around the O-ring pulley 206 with approximately 1 to 4 inches of webbing in between the squeeze buckle 208 and the O-ring pulley 206. Both ends of the small piece 224 can rotate freely around the bar attached to the squeeze buckle 208 as well as the end that is attached to the O-ring pulley 206.

The O-ring pulley 206 may be made of metal, plastic or other material or design suitably strong (or rigid) that serves the same basic mechanical advantage principles of a pulley. In this embodiment as illustrated in FIG. 1, the O-ring pulley 206 is a 1.5 inch diameter metal ring. The O-ring 206 must allow the webbing part 224 to pass through it freely in all directions, which allows flexibility for the lower leash 210, which is attached to the dog so the dog and leash can travel in all directions.

The upper leash 205 is threaded through the O-ring pulley 206. The upper leash 205 comprises several main components, handle 202, quick release 212, large D ring 214 and arm cuff 216.

The handle 202 is at one end of the upper leash. This can be used right or left handed by the user and preferably comprises of a loop of webbing and a rubber or plastic grip to cushion the hand and provide the first part of controlling the leash and dog. The handle grip may be of multiple colors and materials, permanently affixed to the webbing or allowed to rotate freely around an inner cushion or the nylon webbing or leash material. In another embodiment the leash may contain no grip but a have a simple loop of nylon, leather or other material to grip.

The handle 202 is permanently affixed to the webbing 204, which is threaded through the main pulley 206 and attached to a quick release 212. The embodiment shown in FIG. 1 includes an optional quick release 212, which may be omitted in other embodiments. The quick release mechanism 212 may comprise positive 212A and negative 212b Velcro or Velcro-like components that, when stuck together, cannot be pulled apart vertically along the length of the leash. When a loop 212C that is attached to component 212B is pulled at right angles to the webbing, the positive 212A and negative 212B components easily pull apart. The other end of the quick release 212 is attached to a large D-Ring 214. Pulling the two components 212A, 212B apart leaves the handle with one component 212A in the hand of the user while the pulley 206 and lower leash run free with the dog. Quick release mechanism 212 is meant for emergency situations only, since the dog would be free to escape from the user's control when released. As one of ordinary skill in the art will readily recognize, other types of quick-release mechanisms may be used, including, but not limited to, a squeeze buckle type mechanism like squeeze release buckle 208 shown in FIG. 1.

In a preferred embodiment, the piece 212B of the Velcro quick release that is attached to pull tab 212C is fixed permanently to the 2 inch large D-Ring 214 in a manner that allows it to rotate freely around the rounded side thereof.

Figure 3:
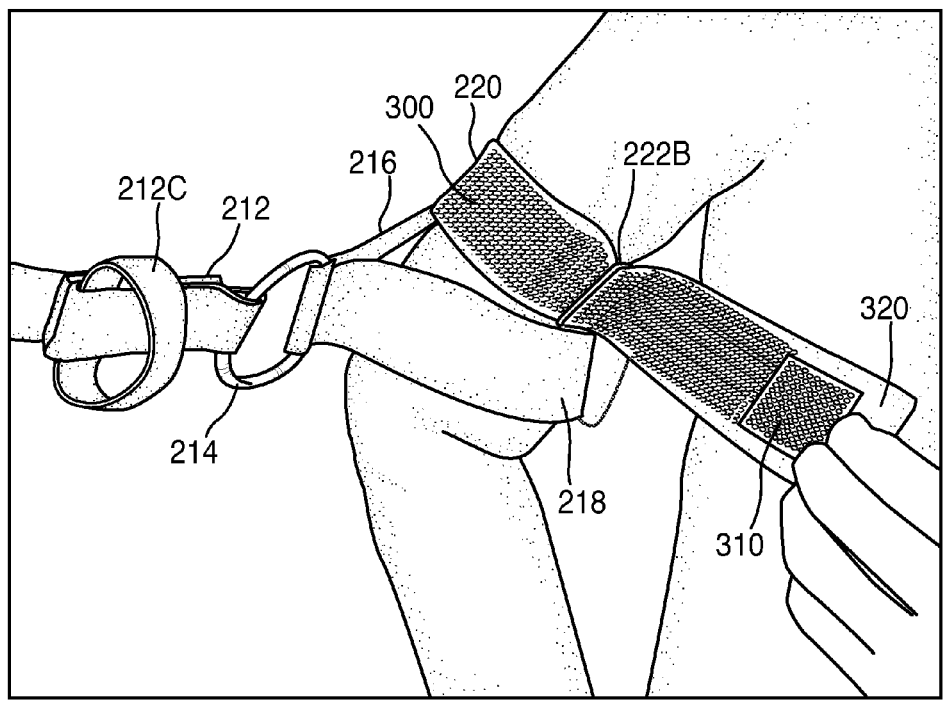
FIG. 3 is a right-side diagram of a first embodiment of the present invention showing a cuff being attached to an arm of a user.
Figure 4:
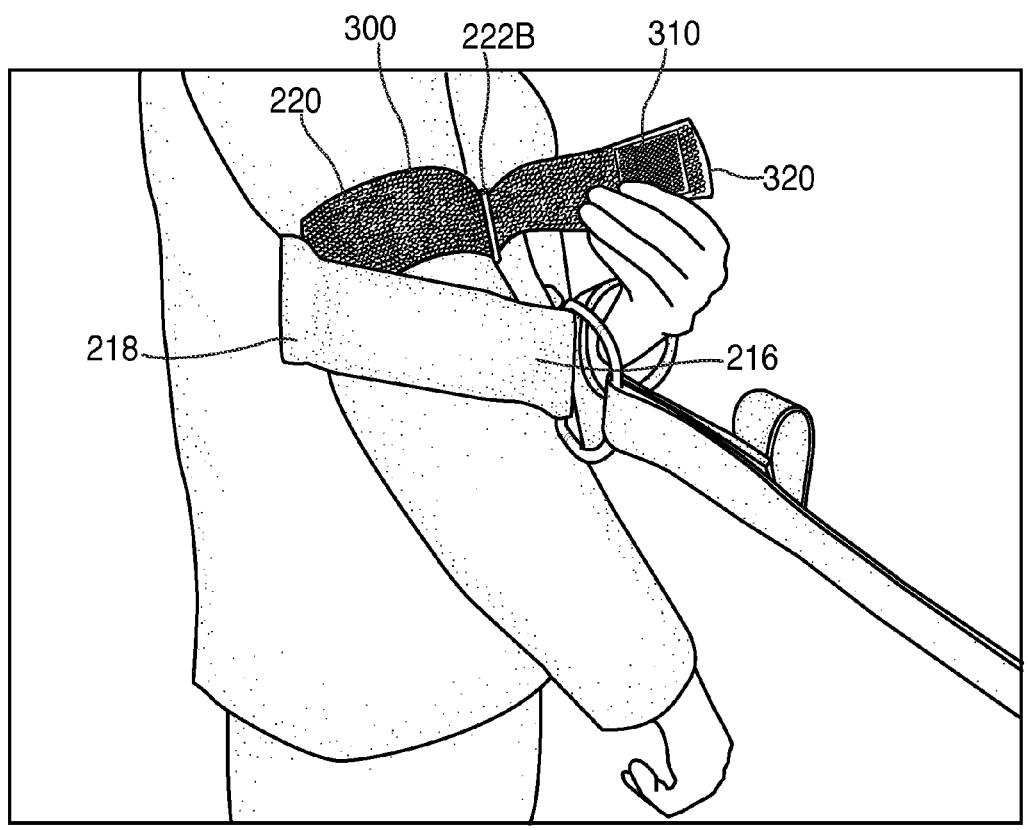
FIG. 4 is a front-side diagram of a first embodiment of the present invention showing the cuff being attached to the arm of the user.
Figure 5:
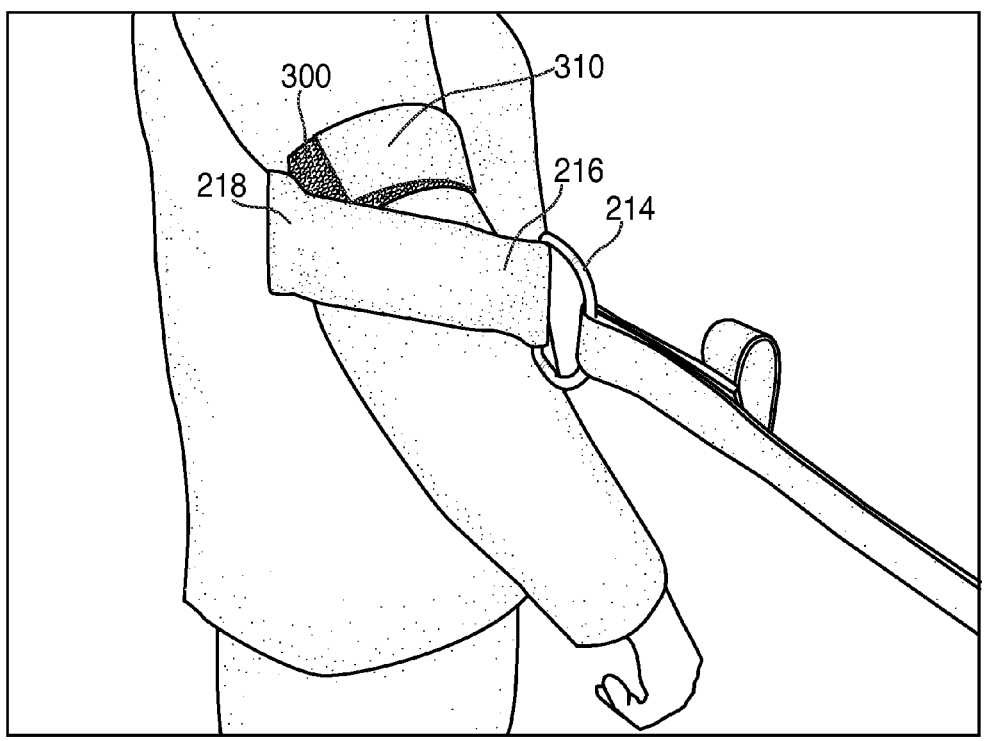
FIG. 5 is a front-side diagram of a first embodiment of the present invention showing the cuff attached to the arm of the user.

Attached to the flat side of the large D-Ring 214 is a larger 2 inch nylon webbing or similar material that forms the outer cuff with back padding 218. The arm cuff 216 is designed so that the user can put their arm through it up past the elbow, tighten it to comfort and it will stay there while walking the dog. The arm cuff 210 comprises an inner cuff 220 with 2-inch elastic Velcro and an outer cuff 218 which may include back padding. The outer cuff 218 has two sewn-in rectangular 2-inch loop locks 222A, 222B approximately 8 inches apart which are sewn to the back padding of the outer cuff 218 in a manner that allows them to move freely so the inner cuff 220 can pass through both loop locks 222A, 222B. The inner cuff 220 is the approximate size of the outer cuff 218 and made with 2 inch elastic with Velcro on one side and in particular on the side facing the inner side of the outer cuff 220. Sewn on the same side at an end 320 thereof is an approximately 1.5 inch square 310 of opposite Velcro to allow the inner cuff 220 to be secured. This can be seen in more detail in FIGS. 3 to 5. The entire inner cuff 220 is sewn securely to the outer cuff, then threaded through loop lock 222A and loop lock 222B. The loop locks 222A, 222B are the same width as the elastic and back pad and are made of metal or plastic. The purpose of the loop locks 222A, 222B is to keep the inner cuff 220 and outer cuff 218 parallel and to provide a method for the elastic of inner cuff 220 to come across the arm. The cuff 216 is attached to the arm as shown in FIG. 3, FIG. 4, and FIG. 5 and discussed below. In overview, the user puts their chosen arm through the inner cuff 220, pulls it tight to comfort and secures it with the Velcro portions 300, 310.

In another embodiment of the arm cuff 216, the inner cuff 220 may have be omitted and the outer cuff 218 simply looped around the upper arm.

Figure 6:
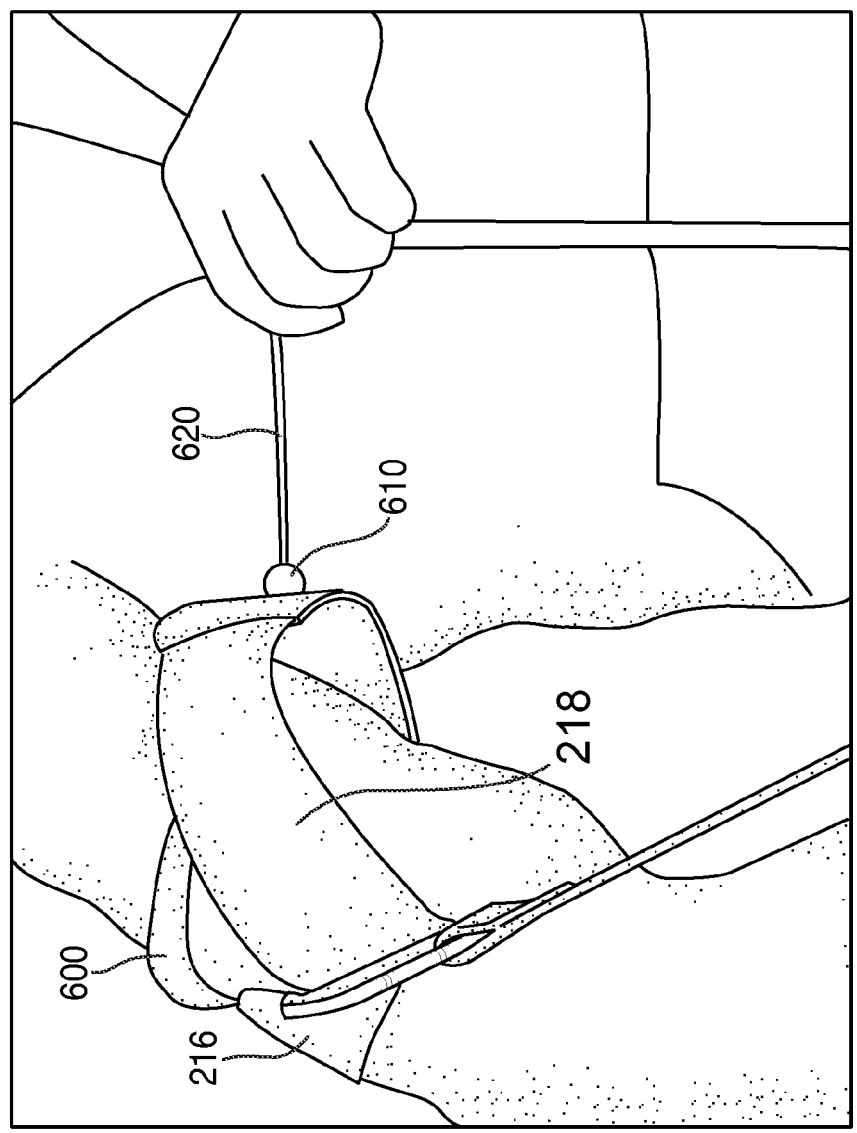
FIG. 6 is a front-side diagram of a second embodiment of the present invention showing the cuff being attached to the arm of the user.
Figure 7:
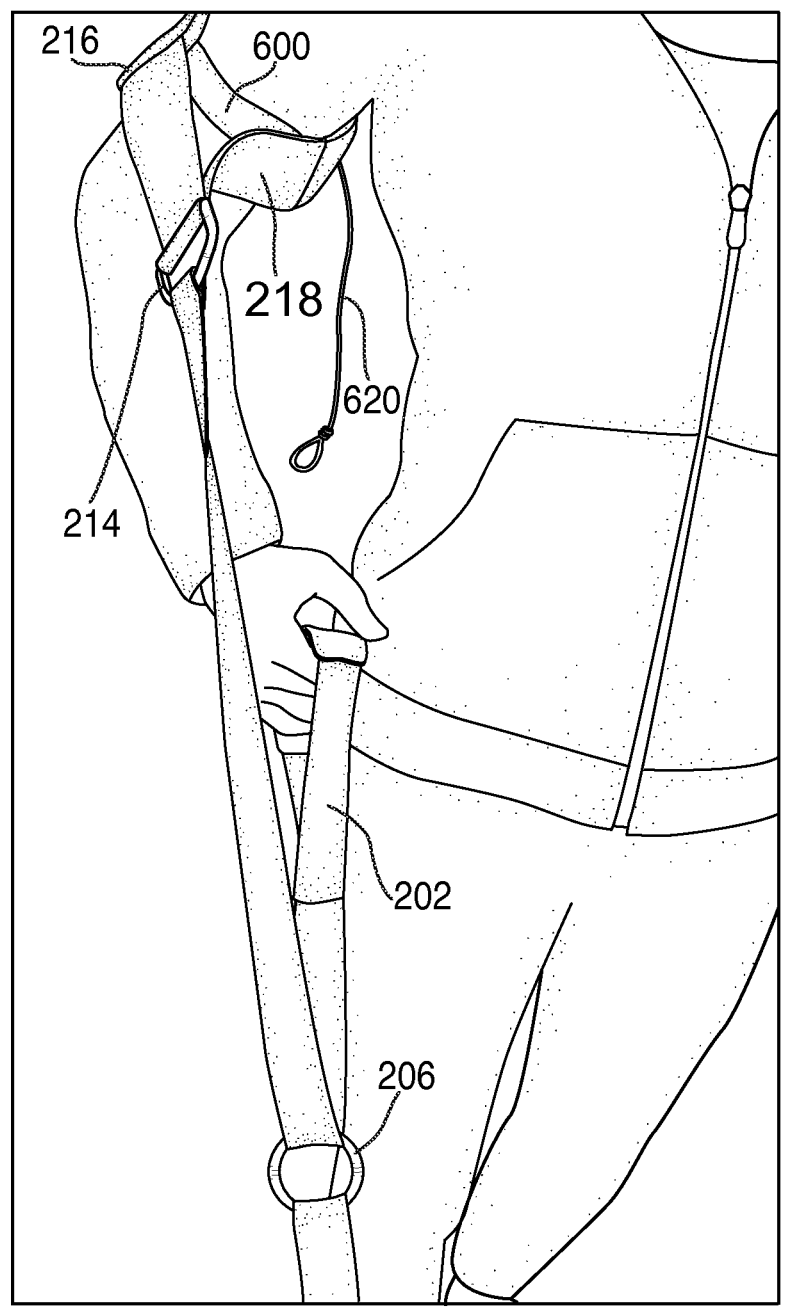
FIG. 7 is a close-up diagram of a second embodiment of the present invention showing the cuff attached to the arm of the user.

In another embodiment of the arm cuff shown in FIGS. 6 and 7, the inner cuff may be replaced by a piece of elastic line 620 which runs through a sleeve 600 and a one-handed operated line lock 610. The elastic line 620 goes from one side of the outer cuff to the other side of the outer cuff 218 (and through sleeve 600) a few inches in from the D-Ring 214 (FIG. 7). The line lock 610 is sewn in and threaded through grommets therein (not shown) so as to run smoothly. A user then simply puts on the cuff 216 and with one hand tightens the line lock 610 by pulling on elastic line 620, which draws the two sides of the arm cuff's nylon webbing together, thereby securing the arm cuff 216 to the arm. When the user wants to remove the arm cuff 216, they release the line lock 610 and the arm cuff 216 loosens, allowing the user to slide arm cuff 216 off. The line lock 610 and elastic line 620 prevent the cuff from falling down the arm when the arm is in the down or relaxed position.

An additional prevention from allowing the cuff 216 to fall down the arm is to line the inside of the cuff 210 with a non-slip type material such as rubber. Many other materials are possible to affix to the padding that add friction between the arm cuff and human skin or clothing material. Non-friction material may be added with or without a mechanism to hold the cuff to the arm or may be made as part of the padded backing material.

In another embodiment of the design of the arm cuff, the cuff may not be made of nylon webbing with padding but of plastic or some other rigid material that may or may not be lined with non-slip material.

In another embodiment of the design of the arm cuff there may be various types of clips that tighten the cuff together or hold the cuff to the sleeve of the user. The clips may involve elastic, metal, springs, plastic, screws, bolts, eyelets, grommets, nylon, cable, wire or leather.

Figure 2:
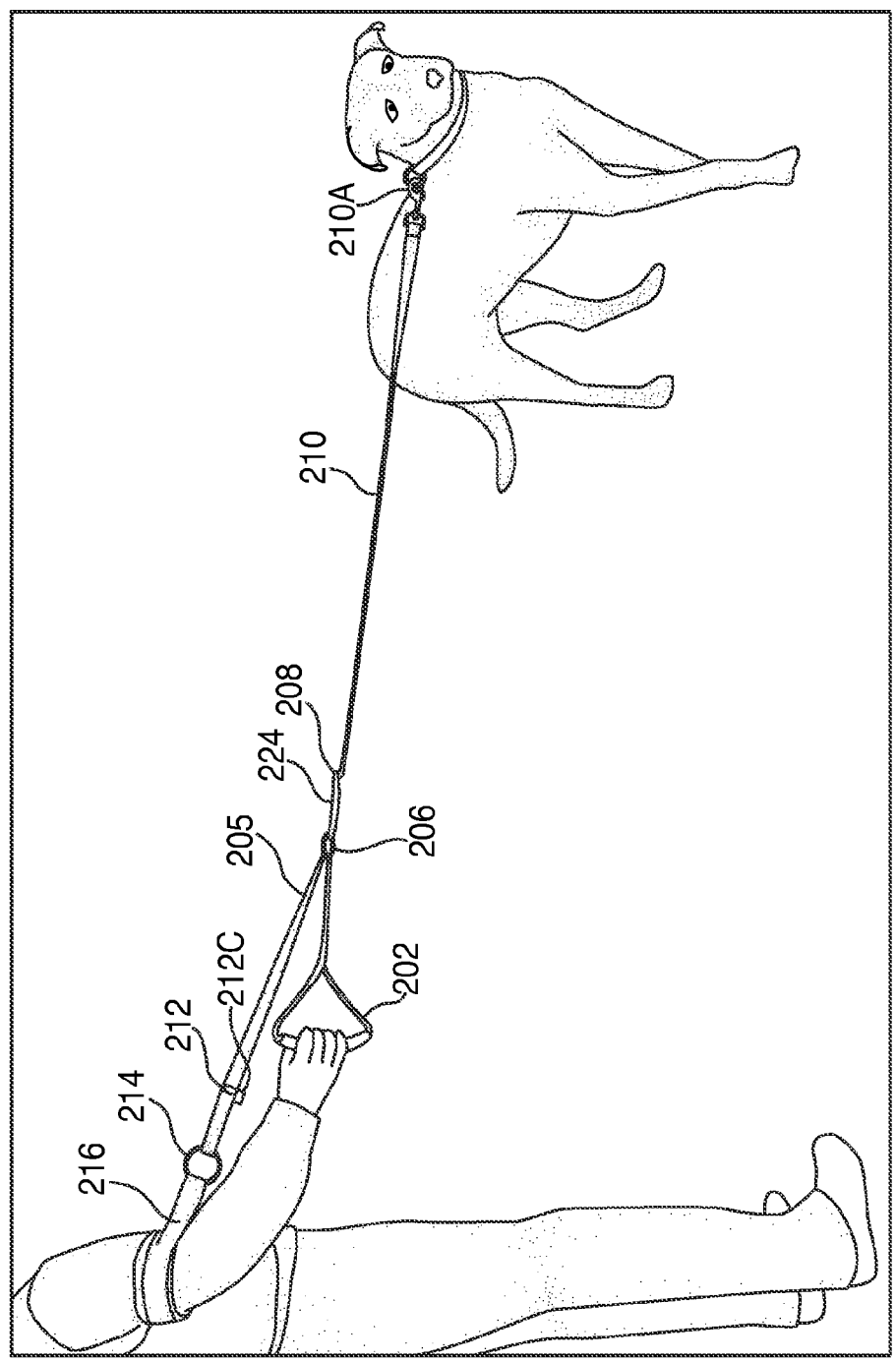
FIG. 2 is a right-side diagram of a first embodiment of the present invention while in use.

In reference to FIG. 2, the leash is shown in use, with arm cuff 216 shown attached to the human body and clip 210A attached to the dog, ready for walking and prior to the dog pulling.

In reference to FIG. 3, the arm cuff is shown during the attachment process. The arm is through the inner cuff 220. The free end 320 of inner cuff 220 is through loop lock 222B and ready to be pulled for fastening. FIG. 3 also shows the 1-inch square "opposite" Velcro (or Velcro-like) patch 310 for use in securing inner cuff 220. Also shown is D-Ring 214 and optional quick release 212.

In reference to FIG. 4, arm cuff 216 is shown during the process of securing inner cuff 220 by folding end 320 of inner cuff 220 over loop lock 22b and securing patch 310 to part 300.

In reference to FIG. 5, arm cuff 216 is shown attached and ready for use. The D-ring 214 is shown off to the side for illustration purposes only and naturally swings around to the forward position when ready to walk the dog as shown in FIG. 2.

The entire leash with the arm cuff 216 on the body and ready to use is shown in FIG. 2. As discussed above, to put the leash on, the user first slides the cuff 216 onto the arm above the elbow, and then secures the Velcro portion as shown in FIGS. 3 and 4. Preferably, the cuff 216 is tightened so that it stays on the arm but is not uncomfortable to the user. Optional padding of the outer cuff 218 may be positioned at the back of the arm above the elbow, over the triceps muscles. D-Ring 214 should be aligned forward when ready to start walking FIG. 3 and FIG. 4 show the D-Ring off to the side for illustration of how the cuff attaches and functions. Since the inner cuff 220 is positioned to the inside of the outer cuff 218, the whole cuff 216 remains in a proper position as the dog and user move. The purpose of the inner cuff 220 is to allow the total arm cuff 216 to stay on the arm above the elbow when the arm is straightened or relaxed. The secured arm cuff 216 is shown in FIG. 5. The cuff 216 should not be too tight to restrict motion, circulation or cause discomfort. There can be some movement as the only purpose of the elastic on inner cuff 220 is to hold the cuff in place. The user then attaches the lower leash 210 with the clip 210A to the dog's harness or collar. After securing the clip to the dog, the user simply picks up the handle and is ready to walk the dog.

During the walking process, as the dog pulls, the user resists by holding or pulling straight back with the handle 202. As the leash 205 runs through the O-ring pulley 206, the force of the dog pulling on the leash is immediately distributed between cuff 216 and handle 202. The leash uses the mechanics of a pulley and a lever to reduce the pulling force of the dog that is actually exerted on the user. The user maximizes the use of natural body mechanics and larger shoulder muscles to walk any type of dog, including strong, pulling, medium or large-sized dogs, with ease. The pull from the dog is mostly felt in the back of the arm or triceps muscle (where there may be additional padding) and then to a lesser extent in the hand, wrist, shoulder and back muscles. In addition, if a user meets up with other dogs being walked and the leashes get tangled, quick release 208 provides a way to quickly separate the lower leash from the O-ring 206 to allow the leashes to be quickly disentangled (and may be quickly reattached as well). Additionally, the handle 202 can be dropped without losing the dog and leaving both hands free for temporary tasks such as unloading groceries or finding car keys (since the handle 202 is not able to pass through O-ring 206).

In a further alternative embodiment, the arm cuff 216 may only include an outer cuff 218, and may further include additional webbing that runs over the shoulder to keep the cuff up. Alternatively, there may be a self-tightening mechanism but not one that would add any additional tightening as the dog pulls causing stress on the arm. In another embodiment of the arm cuff, a plastic or hard piece can be added to improve rigidity and make it easier to take on and off. The leash might also be used to walk other animals such as horses, cows, and circus animals. The leash may also perhaps be used in taming, control and capture of wild animals.

In an alternate use, the leash may also serve as an exercise device for the person since it works several muscles in a divided and gentle fashion while allowing one to increase the weight gradually. Since the leash is extremely portable, it may be used as an effective and efficient traveling exercise device.

In a further alternative embodiment, the cuff 216 may be alternatively placed around a leg of the user. In another further alternative embodiment, the cuff 216 may be alternatively placed around a wrist of the user. In a still further embodiment, the cuff 216 may be replaced by a device similar to clip 210A for coupling to the belt of a user.

While the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

What is claimed is:

1. A leash for an animal, comprising:
a first attachment device for connection to an animal collar or harness;
an arm cuff comprising a fixed, outer circular loop of webbing and an inner circular loop of webbing connected to said outer circular loop;
a first rigid ring;
a handle comprising a grip for a user to hold;
a first member, the first member comprising a first end fixedly coupled to the first attachment device and a second end securely attached to the first rigid ring; and
a second member, the second member comprising a first end fixedly coupled to the handle, a second end coupled to the arm cuff, and a middle portion between the first end and the second end which passes through the first rigid ring.

2. The leash of claim 1, wherein the first member and the second member are formed from flat nylon webbing.

3. The leash of claim 1, wherein the first member and the second member are formed from a material selected from the group consisting of leather, chain, cable, cloth or rope.

4. The leash of claim 1, wherein the second end of the first member is securely attached to the rigid ring via a release mechanism.

5. The leash of claim 1, wherein the second end of the second member is coupled to the arm cuff via a second rigid ring.

6. The leash of claim 5, wherein the second rigid ring is D shaped.

7. The leash of claim 1, wherein the second end of the second member is coupled to the arm cuff via a second rigid ring that is directly coupled to the arm cuff and a quick release mechanism that is coupled between the second rigid ring and the second end of the second member.

8. The leash of claim 7, wherein the second rigid ring is D-shaped.

9. The leash of claim 1, wherein the fixed circular loop webbing is made of nylon.

10. The leash of claim 9, wherein the arm cuff further comprises a back pad secured to an inner portion of the fixed circular loop of nylon webbing.

11. A leash for an animal, comprising:
a first attachment device for connection to an animal collar or harness;
a first member having a first end fixedly coupled to the first attachment device and a second end securely attached to a first rigid ring; and
a second member having a first end fixedly coupled to a handle, a second end coupled to an arm cuff, and a middle portion between the first end and the second end which passes through the first rigid ring,
wherein the arm cuff comprises:
a first fixed circular loop of nylon webbing coupled to the second end of the second member;
first and second rigid loops attached to separate inner portions of the first fixed circular loop, the first rigid loop attached a fixed distance apart from the second rigid loop; and
a second circular loop of nylon webbing having a first end fixedly secured to an inner portion of the first fixed circular loop, a free second end having securing means attached thereto, and a middle portion which respectively passes through the first and second rigid loops and which allows the arm cuff to be securely attached to an upper arm portion of a user using the securing means.

12. The leash of claim 11, wherein the arm cuff further comprises a back pad secured to an inner portion of the first fixed circular loop of nylon webbing.

13. A leash for an animal, comprising:
a first attachment device for connection to an animal collar or harness;
an arm cuff;
a first rigid ring;
a handle comprising a grip for a user to hold;
a first member, the first member comprising a first end fixedly coupled to the first attachment device and a second end securely attached to the first rigid; and
a second member, the second member comprising a first end fixedly coupled to the handle, a second end coupled to the arm cuff, and a middle portion between the first end and the second end which passes through the first rigid ring,
wherein the arm cuff comprises:
a fixed circular loop of nylon webbing coupled to the second end of the second member;
an inner sleeve coupled to an inside portion of the fixed circular loop;
a line lock coupled to an aperture in the fixed circular loop; and
an elastic line having a first end, a middle portion and a second end, the first end fixedly coupled to an inner portion of the fixed circular loop, the middle portion passing through the inner sleeve, through the aperture in the fixed circular loop and through the line lock, wherein the line lock is configured to allow a user to secure and release the elastic line and wherein the user secures the inner sleeve to an upper arm portion of the user by pulling on the second end and engaging the line lock.

14. The leash of claim 13, wherein the arm cuff further comprises a back pad secured to an inner portion of the fixed circular loop of nylon webbing.

15. The leash of claim 13, wherein the arm cuff comprises:
a fixed circular loop of nylon webbing coupled to the second end of the second member; a line lock coupled to an aperture in the fixed circular loop; and
an elastic line having a first end, a middle portion and a second end, the first end fixedly coupled to an inner portion of the fixed circular loop, the middle portion passing through the aperture in the fixed circular loop and through the line lock, wherein the line lock is configured to allow a user to secure and release the elastic line and wherein the user secures the inner sleeve to an upper arm portion of the user by pulling on the second end and engaging the line lock.

16. The leash of claim 15, wherein the arm cuff further comprises a back pad secured to an inner portion of the fixed circular loop of nylon webbing.

17. A leash for an animal, comprising:
a first attachment device for connection to an animal collar or harness;
a first member having a first end fixedly coupled to the first attachment device and a second end securely attached to a first rigid ring; and
a second member having a first end fixedly coupled to a handle, a second end coupled to a cuff, and a middle portion between the first end and the second end which passes through the first rigid ring, wherein the handle has a grip for a user to hold, wherein the cuff comprises a fixed, outer circular loop of webbing and an inner circular loop of webbing connected to the outer circular loop.

18. The leash of claim 17, wherein the cuff is a leg cuff.

19. The leash of claim 17, wherein the cuff couples directly to a belt worn by a user.

20. The leash of claim 17, wherein the cuff is a wrist cuff, and wherein the user holds the handle with one hand and attaches the wrist cuff to a wrist coupled to an opposite hand.

* * * * *